(12) United States Patent
Emam et al.

(10) Patent No.: US 8,204,736 B2
(45) Date of Patent: Jun. 19, 2012

(54) ACCESS TO MULTILINGUAL TEXTUAL RESOURCES

(75) Inventors: Ossama Emam, Cairo (EG); Ahmed Hassan, Cairo (EG); Hany M. Hassan, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 12/266,322

(22) Filed: Nov. 6, 2008

(65) Prior Publication Data

US 2009/0116741 A1 May 7, 2009

(30) Foreign Application Priority Data

Nov. 7, 2007 (FR) .................................. 07120127.1

(51) Int. Cl.
*G06F 17/28* (2006.01)
*G06F 17/20* (2006.01)
*G06F 17/27* (2006.01)
*G06F 17/21* (2006.01)
*G06F 17/30* (2006.01)

(52) U.S. Cl. ............ 704/8; 704/4; 704/5; 704/9; 704/10; 707/736; 707/757; 707/739; 715/264; 715/265

(58) Field of Classification Search .................. 704/4, 5, 704/8, 9, 10; 707/739, 736, 757; 715/264, 715/265

See application file for complete search history.

(56) References Cited

U.S. PATENT DOCUMENTS

| | | | |
|---|---|---|---|
| 6,604,101 B1 | 8/2003 | Chan et al. | |
| 6,756,922 B2 * | 6/2004 | Ossia | 341/51 |
| 6,993,471 B1 | 1/2006 | Flanagan et al. | |
| 7,174,290 B2 | 2/2007 | Loofbourrow et al. | |
| 7,668,887 B2 * | 2/2010 | Vella | 707/706 |
| 2002/0085243 A1 * | 7/2002 | Kanatsu | 358/453 |
| 2002/0111792 A1 | 8/2002 | Cherny | |
| 2002/0168106 A1 * | 11/2002 | Trajkovic | 382/170 |
| 2002/0178156 A1 * | 11/2002 | Ossia | 707/4 |
| 2003/0110181 A1 * | 6/2003 | Schuetze et al. | 707/103 R |
| 2004/0181520 A1 | 9/2004 | Imaichi et al. | |
| 2005/0086224 A1 | 4/2005 | Franciosa et al. | |
| 2005/0123053 A1 * | 6/2005 | Cooper et al. | 375/240.24 |
| 2005/0180602 A1 * | 8/2005 | Yang et al. | 382/103 |
| 2005/0228643 A1 | 10/2005 | Munteanu et al. | |
| 2006/0265209 A1 * | 11/2006 | Bradford | 704/9 |
| 2007/0033001 A1 | 2/2007 | Muslea et al. | |
| 2007/0136276 A1 * | 6/2007 | Vella | 707/5 |

FOREIGN PATENT DOCUMENTS

WO  WO 03/058492 A1  7/2003

OTHER PUBLICATIONS

Ampazis, N.; Iakovaki, H., "Cross-language information retrieval using latent semantic indexing and self-organizing maps," Neural Networks, 2004, Proceedings, 2004 IEEE International Joint Conference, vol. 1, No., pp. 4, Jul. 25-29, 2004.*

(Continued)

*Primary Examiner* — Douglas Godbold
*Assistant Examiner* — Edgar Guerra-Erazo
(74) *Attorney, Agent, or Firm* — Francis Lammes; Stephen J. Walder, Jr.; David A. Mims, Jr.

(57) ABSTRACT

A mechanism is provided for determining a second document of a set of documents in a second language having the same textual content as a first document in a first language. A first histogram that is indicative of the textual content of the first document is generated. A second histogram is generated for each document of the set of documents. Each second histogram is indicative of the textual content of a document of the set of documents. Each second histogram is compared with the first histogram to determine at least one histogram from the plurality of second histograms which matches the first histogram. The second document is then identified as the document having the at least one histogram.

15 Claims, 6 Drawing Sheets

OTHER PUBLICATIONS

Ampazis, N. Iakovaki, H., "Cross-language information retrieval using latent semantic indexing and self-organizing maps," Neural Networks, 2004, Proceedings, 2004 IEEE International Joint Conference, vol. 1, No., pp. 4, Jul. 25-29, 2004.*

Agrawal et al., "Efficient Similarity Search in Sequence Databases", Proceedings of the 4th Intl. conf. on Foundations of Data Organization and Algorithms, Oct. 1993.*

Chung et al., "A Parallel Web Page Identification System", Proceedings of the 22nd IASTED International Conference on Modelling Identification and Control, 2003, pp. 495-500.

Zhao et al., "Adaptive Parallel Sentences Mining from Web Bilingual News Collection", IEEE, International Conference on Data Mining, 2002, pp. 745-748.

* cited by examiner

ACCESS TO MULTILINGUAL TEXTUAL RESOURCES

BACKGROUND OF THE INVENTION

1. Field of the Invention

The invention relates to a method, computer program product and data processing system for the detection of multilingual textual resources carrying the same information content.

2. Background

Textual resources such as news articles and user manuals are often available in several languages. The widespread and increasing use of the internet has made the availability of such textual resources greater. Some of such resources are made available in different languages by the same provider. Others are made available by different providers for example the daily news published on the internet. The same or similar news stories are often found in different languages. The texts of such articles may not be parallel. That is, they may not be an exact translation from one language to another.

The availability of textual resources in different languages may be of enormous use to a user. For example, if a user requires a news article in a second language corresponding to a news article in a first language the availability of such an article in a second language may give the user an accurate translation into the second language. This is of great benefit since machine translation tools may not give translations of an acceptable quality and human translation which gives an acceptable quality can be very expensive. In another example, a user of a device may only have the user guide or instructions for the device in a language which is not their native language. In such a situation, the availability of the user guide and instructions in the user's native language may be of great benefit to the user.

Thus, the availability of multilingual textual resources can be of great benefit to users. There are, however problems in detecting textual resources having the same contents in different languages.

U.S. Pat. No. 6,993,471 proposes a system that translates HTML documents using machine translation software bundled in a browser. This allows a user to access textual resources in languages other than the language that the textual resource was written, however, the quality of the output is limited by the quality of the machine translation software output.

Another approach is to try and collect parallel sentences. For example US 2005/0228643 discloses the extraction of a set of features from the output of a sentence alignment engine, and then uses them to train a maximum entropy classifier to detect parallel sentences. Such a system works to detect parallel sentences, but is not suitable for detecting documents having the same textual content. Textual resources are rarely exact translations of each other even where they come from the same source. There may also be considerable differences in length, and the level of detail.

U.S. Pat. No. 6,604,101 discloses a system for translating a query input by a user in a source language into a target language and searches and retrieves web documents in the target language. Such an approach allows several documents in a second language that match a query in the first language to be found. It does not however allow a document in a second language having the same textual content as a document in a first language to be found.

BRIEF SUMMARY

The illustrative embodiments provide for determining a second document of a set of documents in a second language having the same textual content as a first document in a first language. The illustrative embodiments generate a first histogram that is indicative of the textual content of the first document. The illustrative embodiments generate a second histogram for each document of the set of documents. In the illustrative embodiments, each second histogram is indicative of the textual content of a document of the set of documents. The illustrative embodiments compare each second histogram with the first histogram to determine at least one histogram from the plurality of second histograms which matches the first histogram. The illustrative embodiments identify the at least second document as the document having the at least one histogram.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

BRIEF DESCRIPTION OF THE SEVERAL VIEWS OF THE DRAWINGS

In the following, embodiments of the invention will be described, in greater detail, by way of example only, making reference to the drawings in which.

DETAILED DESCRIPTION

Figure 1:
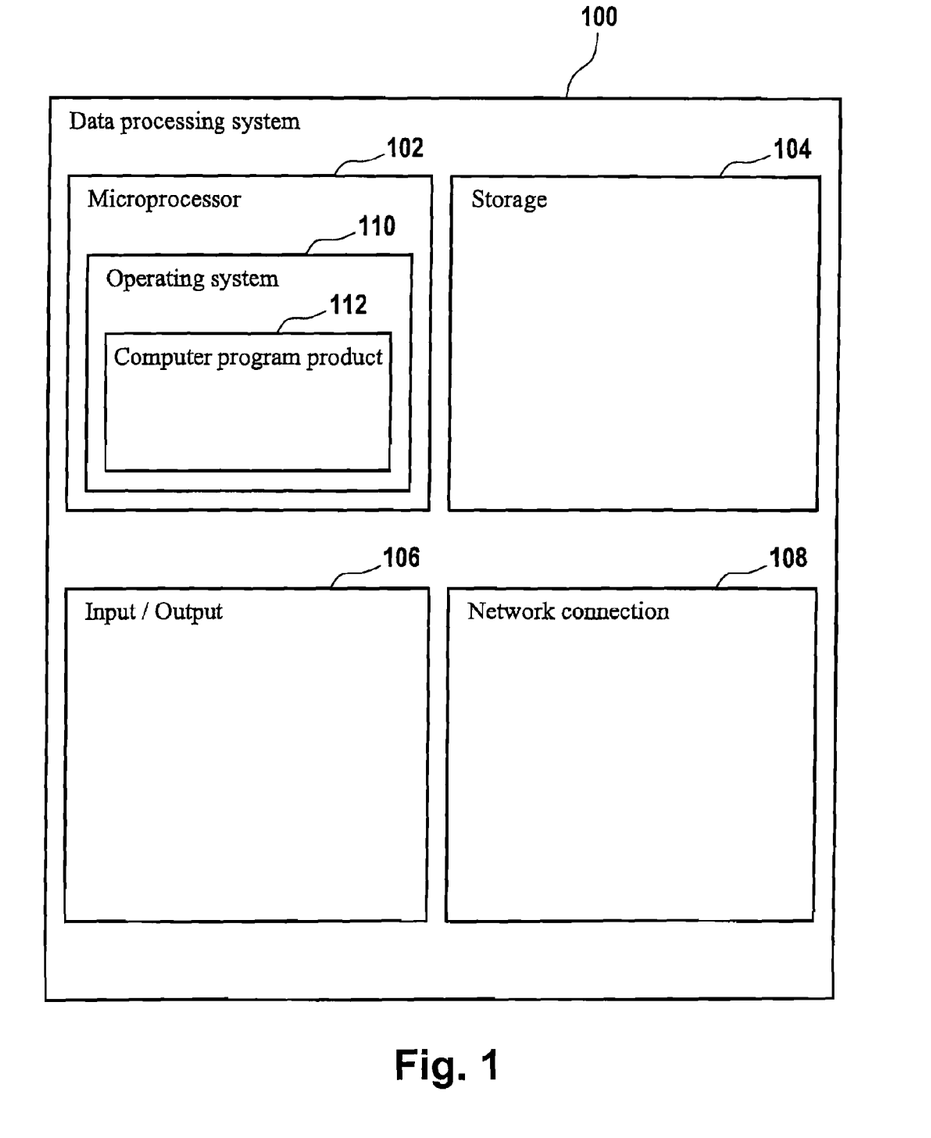
FIG. 1 shows a block diagram of a data processing system.

FIG. 1 shows a block diagram of a data processing system 100. Data processing system 100 comprises a microprocessor 102, storage 104, input/output 106, and network connection 108. Microprocessor 102 executes an operating system 110. The operating system 110 is used to execute computer program product 112. The codes of the operating system 110 and of the computer program product 112 are stored on the storage 104 and loaded for execution onto the microprocessor 102.

Computer program product 112 can be regarded as a tool for determining documents of a set of documents which have the same textual content as a first document in a first language.

Computer program product 112 may be implemented as an add on for a web browser. The web browser may access the internet through network connection 108. Alternatively, computer program product 112 may be implemented as a search engine which is operable to search textual resources. The textual resources may be stored in storage 104, or alternatively may be stored on a remote server, or on the internet and accessed through network connection 108.

Input/output 106 may comprise a keyboard, a mouse, or other input device. Input/output 106 may additionally comprise a display, a sound output device.

Figure 2:
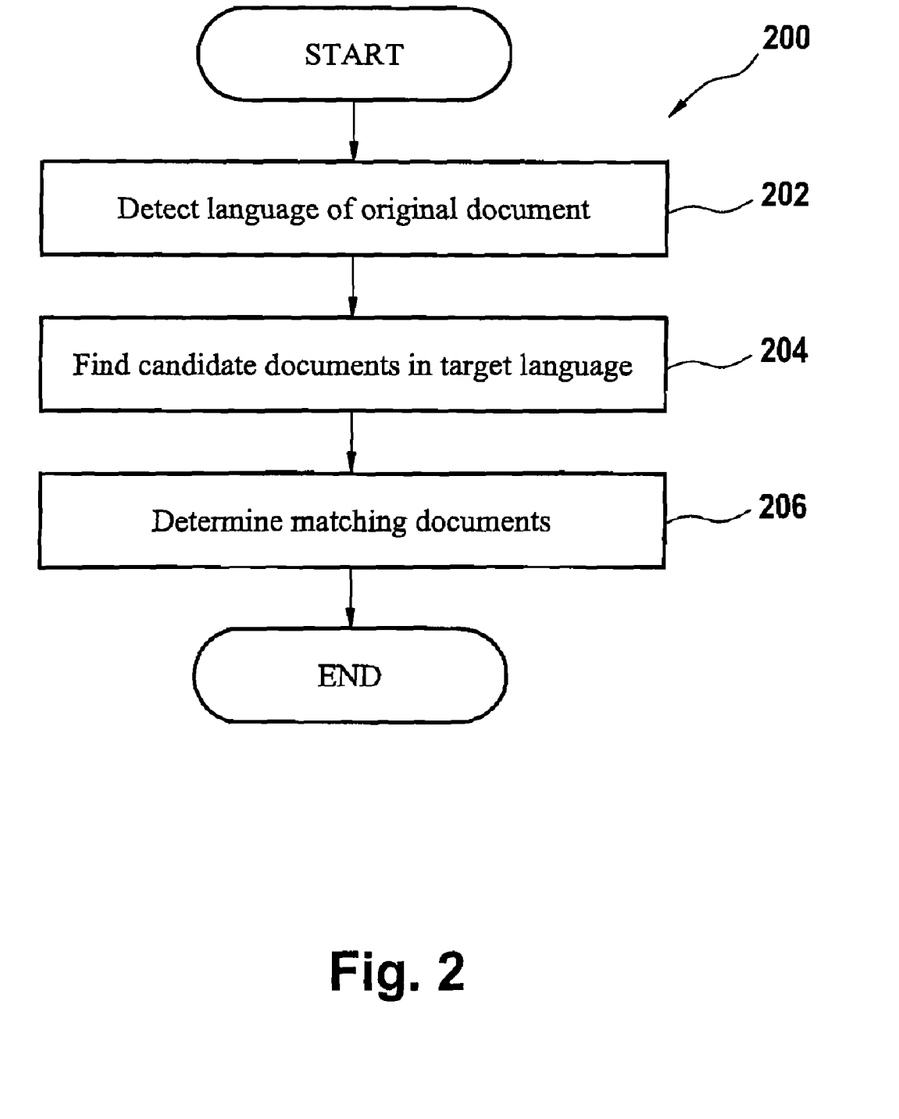
FIG. 2 shows a flow diagram illustrating steps performed in a method of finding a textual resource having the same textual content as an original document.

FIG. 2 shows a flow diagram illustrating method steps involved in the determination of a set of document in a second language having textual content which is the same as the textual content of a first document in a first language. The terms textual resource and document are used interchangeably to refer to any independent text portion. In step 202, the language of the original document is detected. This may be carried out using any known language detection algorithm. In step 204, candidate documents in the target language are found. This may be carried out by, for example extracting terms from the original document, translating them into the target language, and entering them into a search engine. Alternatively, a multilingual search engine may be used to return documents in the target language using search terms in the original language. In the following description the term first language is used to refer to the language of the original document, and the term second language is used to refer to the language of the target document. In step 206 matching documents are determined from the set of documents returned in step 204.

Figure 3:
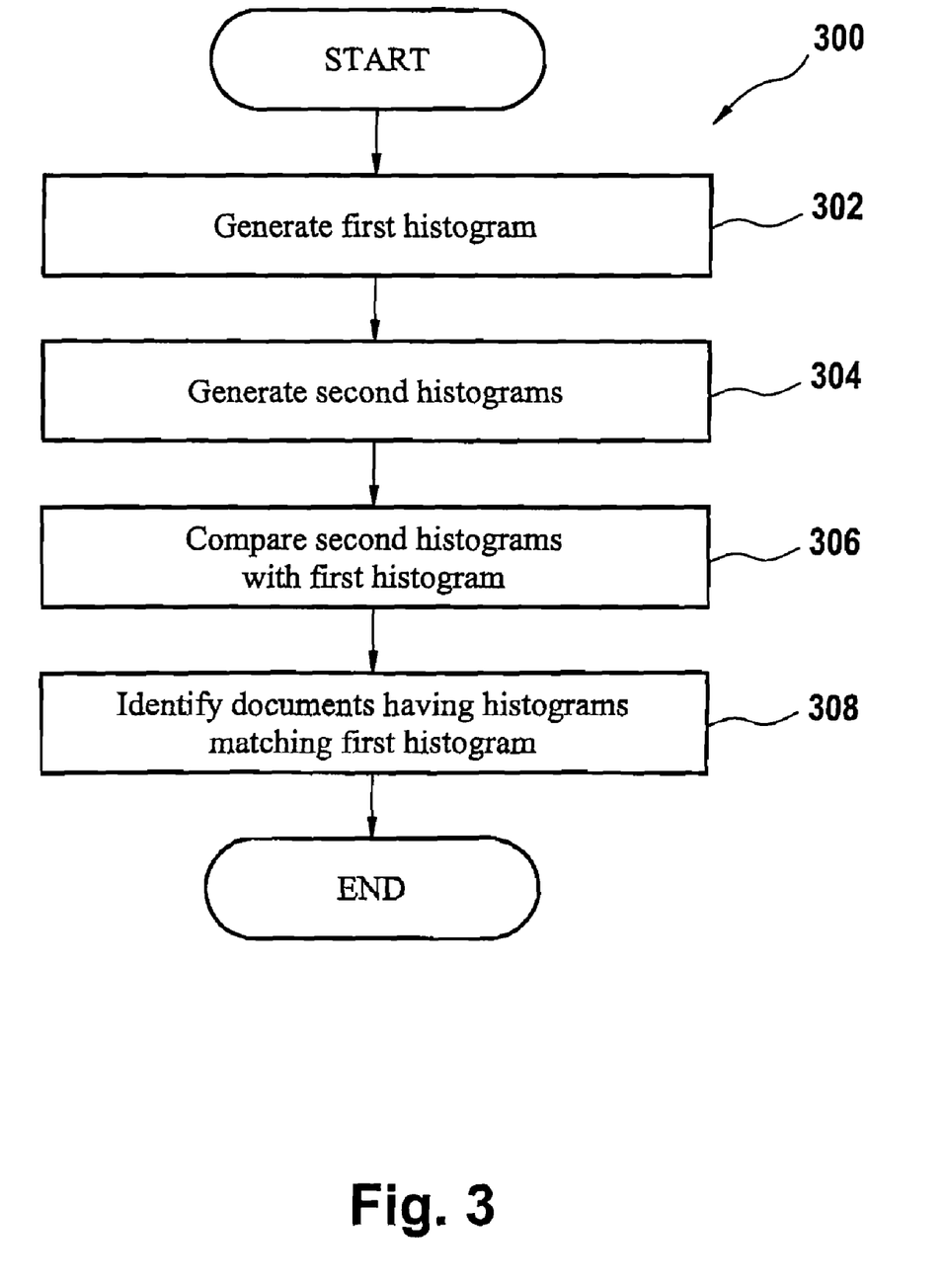
FIG. 3 shows a flow diagram illustrating steps performed in a method of determining documents from a set of documents having textual content matching that of a first document.

FIG. 3 shows a flow chart illustrating method steps involved in the determination of matching documents. The method 300 shown in FIG. 3 represents the step 206 shown in FIG. 2. In step 302, a first histogram is generated from the first document. The first histogram generated from a first document illustrates the textual content of the first document that is, the original document. In step 304, second histograms are generated. The second histograms illustrate the textual content of each of the second documents in the second language that is, each of the potentially matching documents in the target language. In step 306, each of the second histograms is compared with the first histograms. In step 308, documents in the second language having textual content matching the first document in the first language are identified. The documents are identified as those having histograms which match the first histogram.

Figure 4:
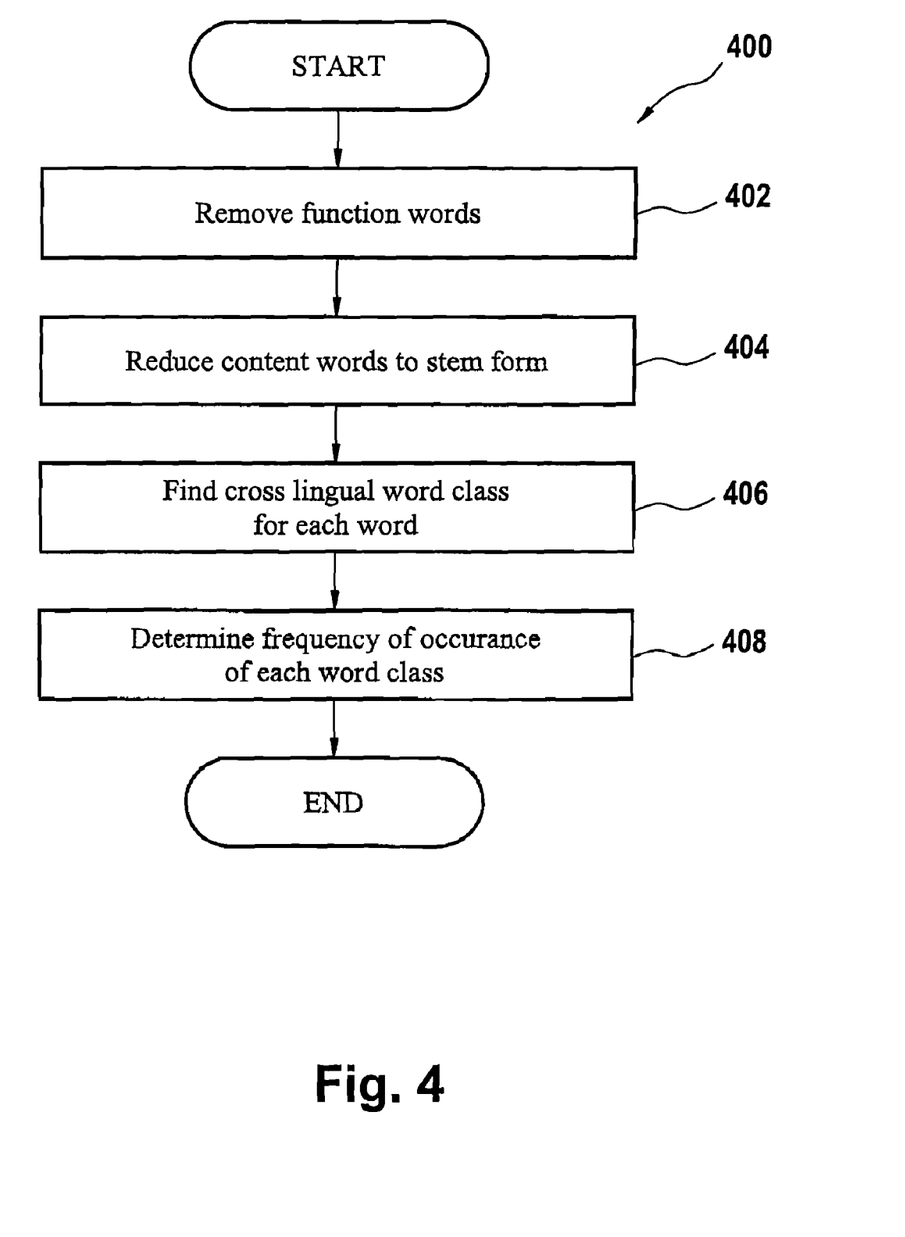
FIG. 4 shows a flow diagram illustrating steps performed in a method of generating a histogram for a textual resource.

FIG. 4 shows a method 400 for generating a histogram for a document. The method 400 involves replacing each textual resource with a conceptual representation. This conceptual representation can then be used to match textual resources bearing the same information content. In step 402, all function words are removed from the document. Function words are words that have little lexical meaning or have an ambiguous meaning. Words which are not function words are called content words or lexical words. Content words include nouns, verbs, adjectives and most adverbs. In step 404, the remaining content words are reduced to stem form. The reduction to stem form, or stemming is the process of reducing inflected or derived words to their stem, base or root form. Following step 404, a list of stemmed content words is obtained for each document. In step 406, each word is looked up in a repository of cross lingual word classes and replaced by the corresponding class ID. Cross lingual word classes are classes of words in different languages bearing the same semantic meaning. After each word is placed in a cross lingual word class, the frequency of occurrence of each cross lingual word class is determined in step 408. A histogram is then a graphical display of the tabulated frequencies of cross lingual word classes.

Figure 5:
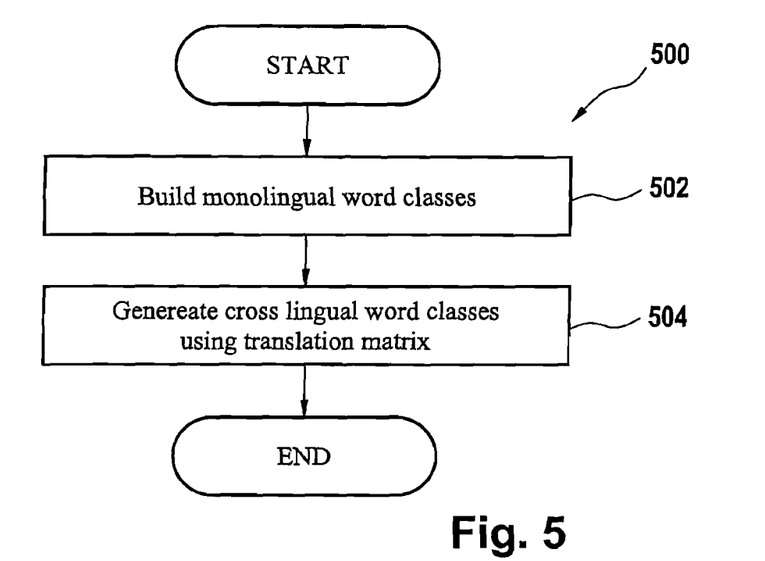
FIG. 5 shows a flow diagram illustrating steps performed in a method of generating cross lingual word classes.

FIG. 5 shows a method 500 for building cross lingual word classes. In step 502, monolingual word classes are built. The process of building monolingual word classes is described in more detail with reference to FIG. 6 below. Once monolingual word classes have been built in step 502, cross lingual word classes are generated in step 504 using a translation matrix.

Figure 6:
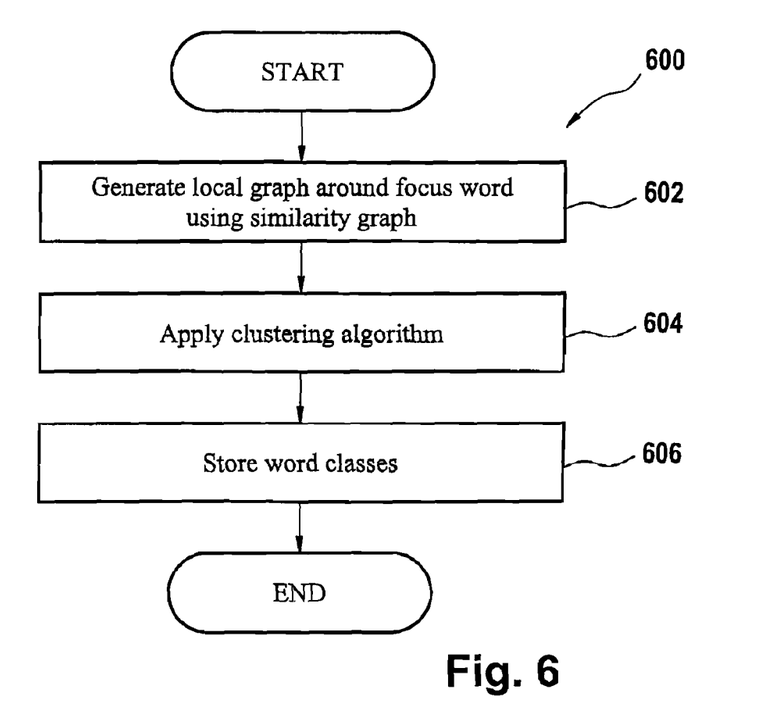
FIG. 6 shows a flow diagram illustrating steps performed in a method of generating monolingual word classes.

FIG. 6 shows a method 600 for building monolingual word classes. In step 602, a local graph is generated using a focus word and a similarity graph to build a local graph around the focus word. The similarity graph is built using a large word corpus, and based on the observation that semantically equivalent words co-occur in similar contexts. Contexts may be identified by extracting all n-grams from a large corpus. The middle word of the n-gram may be taken as the focus word and the rest of the words taken as context.

Five grams may be used, and the word context may be relaxed by replacing some words with their semantic or semantatic classes. Words referring to a named entity may be replaced with the corresponding named entity category. Content words may be left in tact. A large graph may then be constructed with each word stem representing a node. When two words agree on the same context, an edge may be added between their stems in the graph. Edges may be weighted according to a number of context agreements that suggests the two words are similar.

In step 604, a clustering algorithm is applied to the local graph. This may for example be the mark of clustering algorithm. In step 606, the word classes are then stored.

Figure 7:
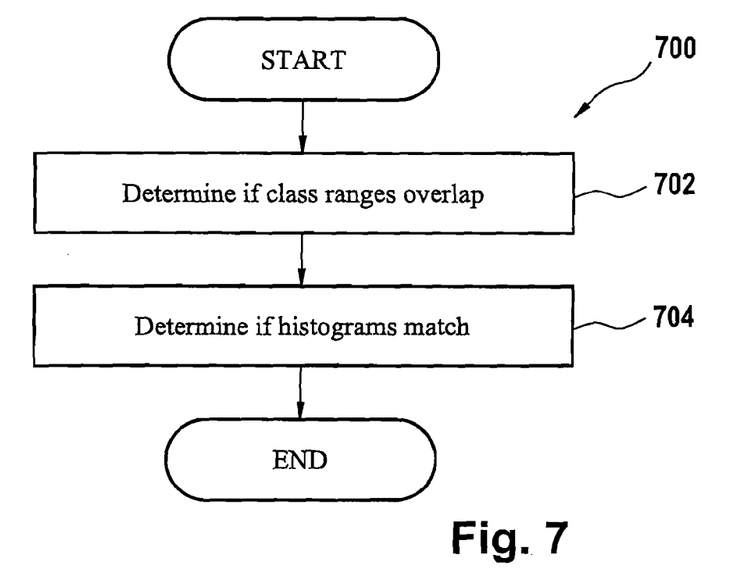
FIG. 7 shows a flow diagram illustrating steps performed in whether histograms match.

FIG. 7 shows a method 700 for comparing histograms. In step 702 a determination is made as to whether the word class ranges overlap. If the word class ranges do not overlap then in step 702 it is determined that the documents do not match context. In step 704, a further determination is made as to whether the histograms match.

Figure 8:
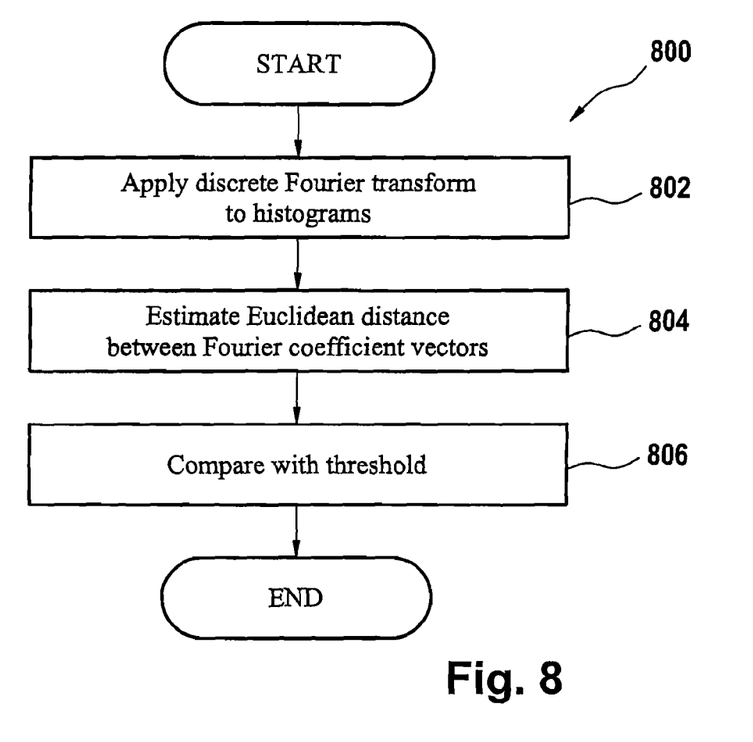
FIG. 8 shows a flow diagram illustrating steps performed in a method of determining whether histograms match.

FIG. 8 shows a method 800 for determining whether histograms match. The method 800 corresponds to step 704 in FIG. 7. In step 802, a discreet word transform is applied to the histogram. The Fourier expansion coefficient vectors can then be extracted. In step 804, the Euclidean distance between the Fourier coefficient vectors is estimated. This distance is used as a score to determine whether the histograms match or not. If the Euclidean distance between the Fourier coefficient vectors is below a certain threshold, then the textual content of the documents represented by the histograms is deemed to match. The comparison with a threshold occurs in step 806.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read only memory (ROM), a rigid magnetic disc and an optical disc. Current examples of optical disks include compact disc-read only memory (CD-ROM), compact disc-read/write (CD-R/W) and DVD.

A data processing system suitable for storing and/or executing computer program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc) can be coupled to the system either directly or through intervening I/O controllers.

Network adapters may also be coupled to the system to enable the data processing system to become coupled to other data processing systems or remote printers or storage devices through intervening, private or public networks. Modems, cable modems, and Ethernet cards are just a few of the currently available types of network adapters.

The invention claimed is:

1. A method, in a data processing system, of determining a second document of a set of documents in a second language having the same textual content as a first document in a first language, the method comprising:
    generating, by a processor, a first histogram, the first histogram being indicative of the textual content of the first document, wherein generating the first histogram for the first document comprises:
        removing, by the processor, all function words from the first document;
        stemming, by the processor, remaining content words in the first document, thereby forming a first set of stemmed content words;
        for each stemmed content word in the first set of stemmed content words:
        identifying, by the processor, a corresponding class identifier in a repository of cross lingual word classes and replacing, by the processor, each stemmed content word with the identified corresponding class identifier; and
        generating, by the processor, the first histogram based on a frequency of occurrence of the cross lingual word classes;
    generating, by the processor, a second histogram for each document of the set of documents, each second histogram being indicative of the textual content of a document of the set of documents, wherein generating the second histogram for the second document comprises:
        removing, by the processor, all function words from the second document;
        stemming, by the processor, remaining content words in the second document, thereby forming a second set of stemmed content words;
        for each stemmed content word in the second set of stemmed content words: identifying, by the processor, a corresponding class identifier in the repository of cross lingual word classes and replacing, by the processor, each stemmed content word with the identified corresponding class identifier: and
        generating, by the processor, the second histogram based on a frequency of occurrence of the cross lingual word classes;
    comparing, by the processor, each second histogram with the first histogram to determine at least one histogram from a plurality of second histograms which matches the first histogram;
    identifying, by the processor, the second document as the document having the at least one histogram; and
    presenting, by the processor, the second document to a user.

2. The method of claim 1, further comprising:
    building, by the processor, cross lingual word classes from mono lingual corpora for the first language and the second language.

3. The method of claim 1, further comprising:
    building, by the processor, mono-lingual word classes for the first language and the second language.

4. The method of claim 1, wherein comparing each second histogram with the first histogram further comprises:
    determining, by the processor, whether a range of multi-lingual word classes in the first histogram and each second histogram match to determine a set of histograms; and
    determining, by the processor, the at least one histogram from the set of histograms which matches the first histogram.

5. The method of claim 4, wherein determining the at least one histogram further comprises:
    taking, by the processor, a Fourier transform of the first histogram and of each of the second histograms; and
    estimating, by the processor, an Euclidean distance between the Fourier coefficients of the first histogram and the Fourier coefficients of each of the second histograms.

6. A computer program product comprising a non-transitory computer readable medium embodying a computer readable program, wherein the computer readable program, when executed on a computing device, causes the computing device to:
    generate a first histogram, the first histogram being indicative of the textual content of the first document, wherein the first document is in a first language and wherein the computer readable program to generate the first histogram for the first document further causes the computing device to:
        remove all function words from the first document;
        stem remaining content words in the first document, thereby forming a first set of stemmed content words;
        for each stemmed content word in the first set of stemmed content words:
        identify a corresponding class identifier in a repository of cross lingual word classes and replace each stemmed content word with the identified corresponding class identifier: and
        generate the first histogram based on a frequency of occurrence of the cross lingual word classes;
    generate a second histogram for each document of the set of documents, each second histogram being indicative of the textual content of a document of the set of documents, wherein each second document of the set of documents is in a second language and wherein the computer readable program to generate the second histogram for the second document further causes the computing device to:
        remove all function words from the second document;
        stem remaining content words in the second document, thereby forming a second set of stemmed content words:

for each stemmed content word in the second set of stemmed content words: identify a corresponding class identifier in the repository of cross lingual word classes and replace each stemmed content word with the identified corresponding class identifier; and generate the second histogram based on a frequency of occurrence of the cross lingual word classes;

compare each second histogram with the first histogram to determine at least one histogram from a plurality of second histograms which matches the first histogram;

identify the second document as the document having the at least one histogram; and present the second document to a user.

7. A data processing system for determining a second document of a set of documents in a second language having the same textual content as a first document in a first language, the data processing system comprising:

a processor; and a memory coupled to the processor, wherein the memory comprises a computer program which configures the processor to:

generate a first histogram, the first histogram being indicative of the textual content of the first document, wherein the computer program to generate the first histogram for the first document further causes the processor to:

remove all function words from the first document;

stem remaining content words in the first document, thereby forming a first set of stemmed content words:

for each stemmed content word in the first set of stemmed content words:

identify a corresponding class identifier in a repository of cross lingual word classes and replace each stemmed content word with the identified corresponding class identifier; and generate the first histogram based on a frequency of occurrence of the cross lingual word classes;

generate a second histogram for each document of the set of documents, each second histogram being indicative of the textual content of a document of the set of documents, wherein the computer program to generate the second histogram for the second document further causes the processor to:

remove all function words from the second document;

stem remaining content words in the second document, thereby forming a second set of stemmed content words;

for each stemmed content word in the second set of stemmed content words: identify a corresponding class identifier in the repository of cross lingual word classes and replace each stemmed content word with the identified corresponding class identifier: and generate the second histogram based on a frequency of occurrence of the cross lingual word classes;

compare each second histogram with the first histogram to determine at least one histogram from a plurality of second histograms which matches the first histogram;

identify the second document as the document having the at least one histogram: and present the second document to a user.

8. The data processing system of claim 7, wherein the instructions further cause the processor to:

build cross lingual word classes from mono lingual corpora for the first language and the second language.

9. The data processing system of claim 7, wherein the instructions further cause the processor to:

build mono-lingual word classes for the first language and the second language.

10. The data processing system of claim 7, wherein the instructions to compare each second histogram with the first histogram further causes the processor to:

determine whether a range of multilingual word classes in the first histogram and each second histogram match to determine a set of histograms; and determine the at least one histogram from the set of histograms which matches the first histogram.

11. The data processing system of claim 10, wherein the instructions to determine the at least one histogram further causes the processor to:

take a Fourier transform of the first histogram and of each of the second histograms; and estimate an Euclidean distance between the Fourier coefficients of the first histogram and the Fourier coefficients of each of the second histograms.

12. The computer program product of claim 6, wherein the computer readable program further causes the computing device to:

build cross lingual word classes from mono lingual corpora for the first language and the second language.

13. The computer program product of claim 6, wherein the computer readable program further causes the computing device to:

build mono-lingual word classes for the first language and the second language.

14. The computer program product claim 6, wherein the computer readable program to compare each second histogram with the first histogram further causes the computing device to:

determine whether a range of multilingual word classes in the first histogram and each second histogram match to determine a set of histograms; and determine the at least one histogram from the set of histograms which matches the first histogram.

15. The computer program product of claim 14, wherein the computer readable program to determine the at least one histogram further causes the computing device to:

take a Fourier transform of the first histogram and of each of the second histograms; and estimate an Euclidean distance between the Fourier coefficients of the first histogram and the Fourier coefficients of each of the second histograms.

* * * * *